US012803184B2

(12) United States Patent
Ludlow et al.

(10) Patent No.: US 12,803,184 B2
(45) Date of Patent: Nov. 17, 2026

(54) MULTIPLE INPUT MULTIPLE STEERED OUTPUT (MIMSO) RADAR

(71) Applicant: PROVIZIO LIMITED, Limerick (IE)

(72) Inventors: Peter Ludlow, Lisburn (GB); Steven Christie, Drumbo (GB); Denver Humphrey, Ballymena (GB)

(73) Assignee: PROVIZIO LIMITED, Limerick (IE)

( * ) Notice: Subject to any disclaimer, the term of this patent is extended or adjusted under 35 U.S.C. 154(b) by 402 days.

(21) Appl. No.: 18/257,474

(22) PCT Filed: Aug. 12, 2021

(86) PCT No.: PCT/EP2021/072554
§ 371 (c)(1),
(2) Date: Jun. 14, 2023

(87) PCT Pub. No.: WO2022/128183
PCT Pub. Date: Jun. 23, 2022

(65) Prior Publication Data
US 2024/0039173 A1 Feb. 1, 2024

(30) Foreign Application Priority Data
Dec. 16, 2020 (EP) .................................... 20214700

(51) Int. Cl.
*G01S 13/02* (2006.01)
*G01S 7/42* (2006.01)
(Continued)

(52) U.S. Cl.
CPC ............ *H01Q 25/008* (2013.01); *G01S 7/42* (2013.01); *G01S 13/32* (2013.01); *H01Q 1/3233* (2013.01);
(Continued)

(58) Field of Classification Search
CPC .. H01Q 1/3233; H01Q 25/008; H04B 7/0617; G01S 7/42; G01S 2013/0245;
(Continued)

(56) References Cited

U.S. PATENT DOCUMENTS

2016/0365631 A1 12/2016 Huang et al.
2017/0329002 A1 11/2017 Koerber et al.
(Continued)

OTHER PUBLICATIONS

Bnilam et al., "RSS-based AoA Estimation System for IoT Applications using Rotman Lens", 2020 14th European Conference on Antennas and Propagation, Mar. 15, 2020, pp. 1-5 (Year: 2020).*
(Continued)

*Primary Examiner* — Dimary S Lopez Cruz
*Assistant Examiner* — Marin Stoytchev Stoytchev
(74) *Attorney, Agent, or Firm* — LOZA & LOZA, LLP; Anthony Smyth

(57) ABSTRACT

A radar comprises a beam-forming network having a first number of input ports and a second number of beam-forming ports, the first and second numbers being greater than 1; a first number of antennas, wherein the first number of antennas is for receiving signals and each antenna in the first number of antennas is connected to a respective input port of the beam-forming network; a second number of receivers, wherein at least two receivers can operate simultaneously, each receiver is connected to a respective beam-forming port of the second number of beam-forming ports; a third number of antennas, wherein the number of antennas is for transmitting a signal, wherein the third number is greater than 1; and a processing means configured to determine the position of an object relative to the radar based on the magnitudes and phases of the signals received by the receivers.

12 Claims, 14 Drawing Sheets

(51) Int. Cl.

| | |
|---|---|
| ***G01S 13/32*** | (2006.01) |
| ***G01S 13/931*** | (2020.01) |
| ***H01Q 1/32*** | (2006.01) |
| ***H01Q 21/00*** | (2006.01) |
| ***H01Q 21/08*** | (2006.01) |
| ***H01Q 25/00*** | (2006.01) |
| ***H04B 7/06*** | (2006.01) |

(52) U.S. Cl.
CPC ....... *H01Q 21/0006* (2013.01); *H04B 7/0617* (2013.01); *G01S 2013/0245* (2013.01)

(58) Field of Classification Search
CPC ............. G01S 2013/0263; G01S 13/02; G01S 13/584; G01S 13/931; G01S 13/4463
See application file for complete search history.

(56) References Cited

U.S. PATENT DOCUMENTS

2020/0096626 A1* 3/2020 Wang .................. G01S 13/4454
2020/0233076 A1* 7/2020 Chen ..................... G01S 13/584

OTHER PUBLICATIONS

Wiebach et al., "Improving the sidelobes of arrays fed by multiple-beam beam formers," Proceedings of the 1998 IEEE Radar Conference, RADCON'98, May 14, 1998 (Year: 1998).*
Zainal et al., "Sidelobe reduction of unequally spaced arrays for 5G applications", 2016 10th European Conference on Antennas and Propagation, Apr. 10-15, 2016 (Year: 2016).*
PCT/EP2021/072554. International Search Report & Written Opinion (Nov. 25, 2021).
Bnilam, et al. "RSS-based AoA estimation system for IoT applications using Rotman lens." 14th European Conference on Antennas and Propagation (EuCAP), Copenhagen, Denmark, pp. 1-5 (2020).

* cited by examiner

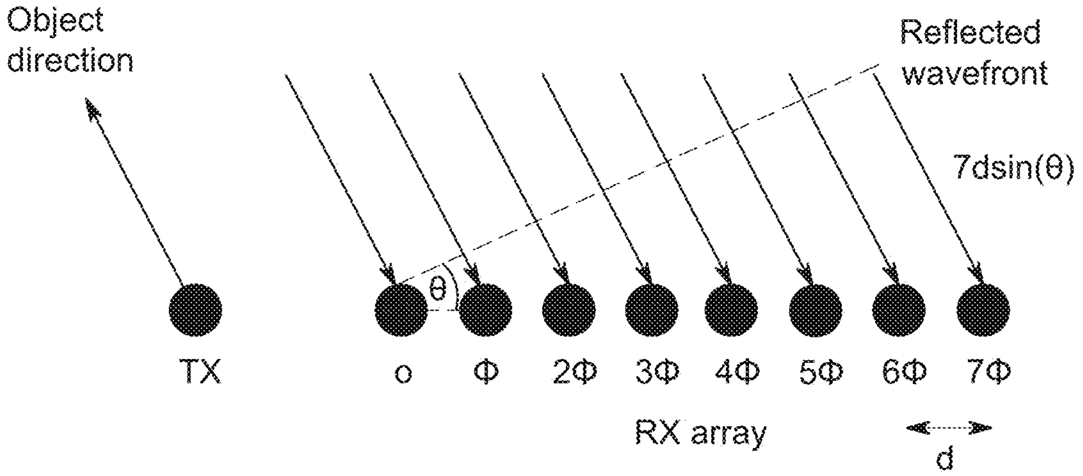
Conventional
FIG. 1
- PRIOR ART -

- PRIOR ART -

- PRIOR ART -

- PRIOR ART -

- PRIOR ART -

Normalised Radiation Pattern

- PRIOR ART -

Normalised Radiation Pattern

- PRIOR ART -

MULTIPLE INPUT MULTIPLE STEERED OUTPUT (MIMSO) RADAR

FIELD OF THE INVENTION

The present disclosure relates to radar systems and methods of electronically sensing the surrounding environment of a vehicle. In particular, the present disclosure is directed to improvements in MIMO (Multiple Input Multiple Output) type radars through the use of a beamforming network such as a Rotman lens.

BACKGROUND TO THE INVENTION

On average road accidents kill 1.35 million people worldwide every year and injure over 50 million more. Even in mere economic terms, road accidents are set to cost 24 trillion US dollars by 2030. Most road accidents are caused by human error, through a lack of foresight, vision, or driver inattention. By mitigating against human error, over 90% of car accidents can be avoided. With this in mind, automotive radar technologies have become more commonplace in an attempt to remove the human error element from road fatalities. In a radar system, a signal is radiated from the radar and the time taken for a reflected signal to be received back at the radar is used to determine where an object is.

There has been a large number of disclosures relating to radar systems (e.g. EP3497473A1, EP2527871B1, U.S. Pat. Nos. 9,070,972B2, 9,869,762B1, 7,924,215B2, EP1666914B1, U.S. Pat. No. 9,041,596B2, JP3256374B2, JP2002228749A, JP2004226158A, U.S. Pat. No. 6,795,012B2, JP2017215328A. EP174201B1, DE10354872B4, U.S. Pat. Nos. 6,275,180B1, 8,686,894B2, CA2901610C, WO2016146666), and more specifically to MIMO radar systems (e.g. T. Shan et al "On spatial smoothing for direction-of-arrival estimation of coherent signals," L. Carin, D. Liu et al "Coherence, compressive sensing, and random sensor arrays," C. Schmid et al "Design of a linear non-uniform antenna array for a 77-GHz MIMO FMCW radar," U.S. Pat. No. 9,664,775B2, US2018/0267555, US2015/0253419A1, U.S. Pat. No. 9,541,639B2). US Patent Publication No. 2020/096626 further describes a radar antenna array for obstacle detection. However, there is a need for a system that provides an accurate estimate of the position of an object within an adequate timeframe without the use of expensive sensors or processing hardware, thereby mitigating the impact of human error in automotive applications.

OBJECT OF THE INVENTION

The present disclosure is directed towards improving the angular resolution for a given number of transmitters and/or receivers. This in turn can be used to decrease the number of transmitters and/or receivers required for a given angular resolution. Furthermore, the present disclosure is directed towards reducing the computational complexity of MIMO systems designed for a given angular resolution. This advantageously reduces latency for object detection in MIMO radars. Further, reducing the complexity of the system in turn reduces manufacturing complexity when compared to other lens-based radars.

Other advantages provided by the present disclosure are that the system described herein has a flat structure which allows easier integration into automotive systems, increasing the applications for which a system can be used and reducing integration costs. Further, the proposed system can optionally be tailored such that it has an increased focus on areas of most need—e.g. a high angular resolution can be provided at boresight (straight in front) while a reduced angular resolution can be provided at angles beyond ±45°. Further, the proposed system can optionally be tailored to have a narrow field of operation, depending upon the requirements of the radar system, whereas prior art MIMO radar systems typically have a wide field of view by their nature. The field of view (FOV) of a radar is the angular cone perceivable by the sensor at a particular time instant.

SUMMARY OF THE INVENTION

The present application is directed towards a radar for a road vehicle comprising: a beam-forming network comprising a Rotman lens having a first number of input ports and a second number of beam-forming ports, wherein the first and second numbers are greater than 1; a first number of antennas, wherein the first number of antennas is for receiving signals and each antenna in the first number of antennas is connected to a respective input port of the beam-forming network; a second number of receivers, wherein at least two receivers can operate simultaneously and each receiver of the second number of receivers is connected to a respective beam-forming port of the second number of beam-forming ports; a third number of antennas, wherein the number of antennas is for transmitting a signal, wherein the third number is greater than 1; and a processing means configured to determine the position of an object relative to the radar based on the magnitudes and phases of the signals received by the receivers, wherein: the beam-forming network is configured to combine signals received by at least two of the first number of antennas from at least two of the third number of antennas, and wherein the beam-forming network is further configured to apply an additional phase term to each signal being combined so as to form a beam at a desired angle.

A plurality of time delayed balanced lines can preferably be used to connect the beam-ports of the beam-forming lens to the receivers. As used herein the term receiver is used to encompass any hardware suitable for processing a signal received from an antenna and can for example be included as part of a transceiver set.

Similarly, a plurality of time delayed balanced lines can preferably be used to connect a transmitter to each of the third number of antennas. As used herein the term transmitter is used to encompass any hardware suitable of generating a signal for transmission to an antenna and can for example be included as part of a transceiver set.

Preferably, the first number of antennas is arranged in a line, with a predefined distance d between each antenna, and the third number of antennas is arranged in a line, with a distance of N×d between each antenna, where N is the first number.

The term beam-forming network as used herein refers to any analogue network (such as a lens) used for beam forming and any conventional equivalent, e.g. a dielectric lens, an RKR lens, a Luneburg lens, etc. However, a Rotman lens has been found to be a particularly advantageous beam forming network for the purposes of the present disclosure.

In use, the Rotman lens forms a virtual array of Rotman lenses through use with the third number of antennas, and the Rotman lens is configured such that individual beams formed by the virtual array Rotman lens overlap.

Preferably, the individual beams formed by the virtual array Rotman lens overlap at half the peak value of each beam. Preferably, the beamwidths of the individual beams formed by the virtual array of Rotman lenses are narrower than those of the Rotman lens. More preferably, the beamwidths are multiplied by a factor which is inversely proportional to the third number of antennas.

Optionally, the Rotman lens can be configured such that the beam ports are concentrated around the boresight of the radar. This is advantageous because it will improve the angular resolution of the radar around the boresight of the radar (i.e. straight ahead of the radar) where angular accuracy is critical. Preferably, the beams formed by the Rotman lens will cover a wide field of view (for example, 120°, or ±60° from the array boresight direction), but other narrower fields of view may be desirable, as required by the application.

Preferably, all antennas are configured to operate with millimetre wave signals.

The present application is also directed towards a radar for a road vehicle comprising: a beam-forming network having a first number of input ports and a second number of beam-forming ports, wherein the first and second numbers are greater than 1; a first number of antennas, wherein the first number of antennas is for receiving signals and each antenna in the first number of antennas is connected to a respective input port of the beam-forming lens; a second number of receivers, wherein at least two receivers can operate simultaneously and each receiver of the second number of receivers is connected to a respective beam-forming port of the second number of beam-forming ports; a third number of antennas, wherein the number of antennas is for transmitting a signal, wherein the third number is greater than 1; and a processing means configured to determine the position of an object relative to the radar based on the magnitudes and phases of the signals received by the receivers, wherein: the beam-forming network is configured to combine signals received by at least two of the first number of antennas from at least two of the third number of antennas.

The present application is also directed towards a method of determining the position of an object relative to a radar for a road vehicle. The method comprises: transmitting signals from a plurality of transmit antennas; receiving the signals at a plurality receive antennas; providing the received signal from at least two receive antennas to the input ports of a beam-forming network comprising a Rotman lens, wherein the beam-forming network has a plurality of beam-forming ports and the beam-forming network is configured to combine signals received at its input ports and provide the combined signals to its beam-forming ports, and wherein the beam-forming network is further configured to apply an additional phase term to each signal being combined so as to form a beam at a desired angle; obtaining the outputs from the beam-forming network at a plurality of receivers, wherein each receiver is connected to a respective beam-forming port of the beam-forming network; and processing the obtained outputs to determine the position of an object at each receiver based on the magnitudes and relative phases of the combined signals provided to the receivers from the beam-forming ports of the beam forming network.

Preferably, the method comprises configuring the receive and/or transmit antennas in a linear array comprising at least four antennas, wherein the distance between at least the central antennas of the array is d and the distance between the outermost antennas and the respective proximate antenna is greater than d.

The word 'and/or' as used above refers to an inclusive or—i.e. A and/or B means one of: A; B; or A and B.

By providing a linear array with predefined unequal distances between each antenna the linear array can be configured so that the characteristics of the main beam is unaffected, and a reduced number of antennas can be used.

Alternatively, the method comprises configuring the receive antennas so that they are arranged in a first line, with a predefined distance d between each receive antenna, and configuring the transmit antennas so that they are arranged in a second line, with a distance of N×d between each transmit antenna, where N is the number of receive antennas.

Preferably, the method configures the receive antennas in a first line and the transmit antennas in a second line, wherein the first line is substantially parallel to the second line.

In an alternative embodiment, the method configures the receive antennas in a first line and the transmit antennas in a second line, wherein the first line is not parallel to the second line. In this embodiment, the first line is preferably at an angle of greater than 45° to the second line. More preferably, the first line is orthogonal to the second line.

Preferably, the beam-forming network is a Rotman lens. The Rotman lens forms a virtual array of Rotman lenses through use of the plurality of transmit antennas. The Rotman lens is preferably configured such that individual beams formed by the virtual array of Rotman lens overlap.

Optionally, the Rotman lens is configured such that the beam ports are concentrated around the boresight of the radar.

Preferably, the radar signals transmitted and received by the antennas, and processed by the Rotman lens, are millimetre wave radar signals.

The present application is also directed towards a method of determining the position of an object relative to a radar for a road vehicle. The method comprises: transmitting signals from a plurality of transmit antennas; receiving the signals at a plurality receive antennas; providing the received signal from at least two receive antennas to the input ports of a beam-forming network, wherein the beam-forming network has a plurality of beam-forming ports and the beam-forming network is configured to combine signals received at its input ports and provide the combined signals to its beam-forming ports; obtaining the outputs from the beam-forming network at a plurality of receivers, wherein each receiver is connected to a respective beam-forming port of the beam-forming network; and processing the obtained outputs to determine the position of an object at each receiver based on the magnitudes and relative phases of the combined signals provided to the receivers from the beam-forming ports of the beam forming network.

BRIEF DESCRIPTION OF THE DRAWINGS

The invention will be more clearly understood from the following description of an embodiment thereof, given by way of example only, with reference to the accompanying drawings, in which:

FIG. 1 shows prior art of a conventional 8 receive element antenna configuration;

DETAILED DESCRIPTION OF THE DRAWINGS

Figure 2:
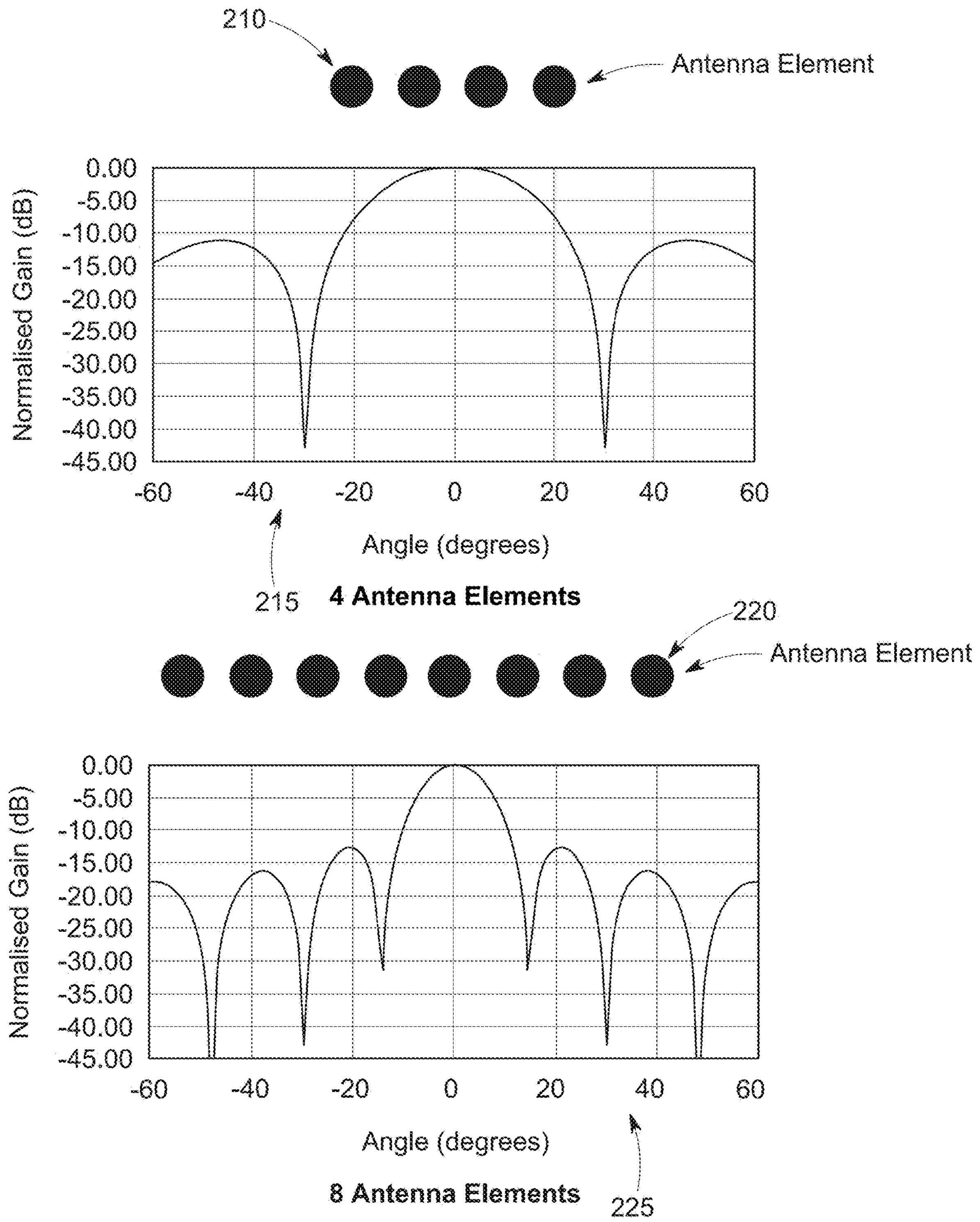
FIG. 2 shows the comparison between a 4-element antenna beam pattern and an 8-element antenna beam pattern.

For the next generation of automotive radars for use with a vehicle (such as e.g. a car, a bus, a truck, etc) angular detection of objects with resolution in the order of 1 degree will be required. Preferably, systems mounted to or integrated with a vehicle should also provide full 360-degree coverage around the vehicle. This is likely to be achieved by using multiple radar systems for a single vehicle, each radar system covering a different angular segment such that together the multiple radar systems provide full 360-degree coverage for the vehicle.

To resolve the angular position of an object, a technique known as 'beam forming' can be used. Beam forming uses a plurality of antennas arranged in an array (at either the transmitter (commonly abbreviated to TX) or the receiver (commonly abbreviated to RX), or at both the transmitter and the receiver). The array of antennas is used to manipulate the wave coherence of the signals transmitted from the antennas to focus the energy transmitted or received by each antenna into a narrow beam, thereby increasing the power in the direction of the beam's peak, and reducing the power in all other directions. The characteristics of the beam, such as its steering angle, and width, can be manipulated through adjusting the amplitude and phase of the signal at each antenna in the array. Narrowing the resultant beam can be achieved by increasing the number of antennas in the array. For a transmission array, increasing the number of antennas in the array increases the focus of the transmitted signal, leading to higher array gain. Beam forming radars can be logically divided into two broad groups: analogue and digital.

In a first type of analogue radar, the radar's angular performance is determined by one or more physical antenna beam forming structures. This includes radars where beam manipulation is completed within these antenna beam forming structures. Antenna systems implemented in this way have been used in numerous applications, such as base stations and military and space radar systems. In conventional electronic beam-steering antenna systems, where the direction of the main lobe of the antenna beam pattern is electronically moved, radio frequency (RF) phase shifters are typically used to dynamically adjust the relative phase between antenna elements. Thus, radio frequency (RF) phase shifters are a key component for steering a narrow beam pattern of a phased array antenna in a beam-steering antenna system.

In an alternative analogue approach, a lens feed structure can be used as a beam forming component. In particular, a lens feed structure (e.g. a Rotman lens) has a plurality of feed ports configured to feed received signals to a beam forming component. In use:

i) each feed port is operatively coupled to a switched port, where switching between the feed ports of the lens feed structure is used to couple a single transceiver, transmitter or receiver to the appropriate feed port for a desired beam direction;

ii) each feed port is operatively coupled to multiple transceivers, transmitters or receivers, where the hardware connected to a feed port for a desired beam direction is active, while the hardware connected to the other feed ports is deactivated;

iii) each feed port is operatively coupled to multiple transceivers, transmitters or receivers, where hardware connected to two or more of the feed ports is active, to enable reconfiguration of a transmitted radiation pattern, or simultaneous observation of multiple receive beam directions; or iv) each feed port is operatively coupled to a combination of: switched ports and multiple transceivers, transmitters or receivers. By scanning the transmit and receive beams, the angular position of a target can be determined.

Analogue radars are generally large (i.e. contain a large number of radio frequency (RF) components and thus carry an increased risk of component failure) but can determine the angular position of an object with minimal computational processing.

Digital radars use complex computational algorithms to digitally 'beam form' the transmitted and/or received signals of the radar. These radars are generally smaller, with fewer RF components, but require more complex computational processing, which may lead to increased latency depending on the CPU processing capabilities of the system.

The arrangement of TX antenna(s) (also referred to as 'transmit element' or 'transmit antenna element') and RX antenna(s) (also referred to as 'receive element' or 'receive antenna element') in a radar system can therefore take on many different forms. Both analogue and digital radar systems have advantages and disadvantages and are not mutually exclusive. Nevertheless, radar architectures generally follow one approach or the other.

Both analogue and digital beam forming receivers utilise the fact that when a signal is incident upon multiple antennas, there is a time delay between the signal arriving at each element, which is dependent upon the angle of incidence.

For example, FIG. 1 shows a wavefront incident on an array of 8 RX antennas at an angle θ, where the antennas are separated by a spacing of d. For an array of n antennas having a distance of d between each RX antenna, and an angle $\theta_i$, the wavefront travels an extra distance of $(n-1)d\times\sin(\theta_i)$ to reach the nth RX antenna in the array compared to the first element the wavefront reached. This extra travel distance gives rise to a corresponding phase delay of $(n-1)\varphi_i$ at the nth RX antenna, where:

$$\varphi_i = \frac{2\pi}{\lambda} d\sin(\theta_i)$$

Note that if the signal arrives at an incident angle of 0, then it reaches each element simultaneously, and $\varphi_i=\theta_i=0$.

The angle from which a signal originates can be calculated by performing a mathematical operation known as a Discrete Fourier Transform (DFT) on the magnitude and phase outputs from the array, which can be computed using any Fast Fourier Transform (FFT) algorithms known in the art. The resolution of the prior art system is typically improved by increasing the number of RX antennas in the receive array.

When the signals received by each element in the array are combined, the magnitude of the resulting signal is dependent upon the angle of arrival of the signal, and the complex weighting (having an amplitude and phase) of the signal received by each element. Mathematically, this focusing effect produced by the array can be expressed as the multiplication of the array factor with the radiation pattern of a single element in the array.

The array factor is the complex valued far-field radiation pattern of an array of isotropic radiators (i.e. theoretical antennas which have no directivity and radiate equal energy in all directions). The one-dimensional array factor for a linear array is calculated at each discrete angle θ using:

$$AF(\theta) = \sum_{n=1}^{N} w_n e^{j\frac{2\pi n}{\lambda} d\sin(\theta)}$$

Where $w_n$ is a complex weighting at the nth element in the array, and d is the element separation. An array factor, in the shape of a beam with a single peak at the scan angle $\theta_s$, is formed by using a progressive phase delay in the weightings, $w_n$, across the array of $(n-1)\varphi$ at the nth element;

$$\theta_s = \sin^{-1}\left(\frac{\varphi_s \lambda}{2\pi d}\right)$$

FIG. 2 shows the array factor 215 for a four-element array 210 and the array factor 225 of an eight-element array 220. Each array factor in FIG. 2 is calculated without additional phase added at each element and thus maximised where $\theta_s=0°$. The peak of the array factor can be scanned over a radar's FOV by varying $\varphi_s$. When the value of $\varphi_s$ used in the array weightings is equal to the value of $\varphi_i$, the phase delay across the array elements due to the angle of incidence of the received signal, the signals combine coherently to form a peak. The Array Factor equation is analogous to the Discrete Fourier Transform (DFT):

$$X_k = \sum_{n=0}^{N-1} x_n e^{j\frac{2\pi}{N}kn}$$

Fourier Transforms are also used in Frequency Modulated Continuous Wave (FMCW) radar systems for target range and velocity estimation and can be computed using a Fast Fourier Transform (FFT). The array factor can be converted to decibels using the following equation:

$$AF_{dB}(\theta) = 20\log_{10}[AF(\theta)]$$

When the array factor is calculated using the antenna locations of a physical array, and is multiplied by the radiation pattern of a single physical antenna in that array (i.e. the real antenna, having its own complex radiation pattern), the resulting radiation pattern provides a good approximation for the radiation pattern of the physical array (not including effects such as mutual coupling between elements in the physical array which may alter the pattern). In decibel form, the gain of the array is therefore given by:

$$G_A(\theta) = AF_{dB}(\theta) + G_E(\theta)$$

Where $G_E$ is the gain of a single element.

When the beam forming consists of circuitry arranged in a specific manner so that an operation (e.g. 'addition' or 'subtraction' of RF signals through circuit elements such as hybrid couplers; adding time delays through a lens such as e.g. a Rotman lens or a Luneburg lens; or phase shifts through phase shifter circuit elements) is performed by analogue circuitry between the RX antennas and the remaining signal processing elements of the receiver, such an arrangement falls within the earlier definition of an analogue type radar. In the case of analogue beam steering, the analogue circuitry performs an operation which is analogous to a DFT. In the case of a conventional phased array, phase shifters are used to vary the phase, $\varphi_s$, of the complex weighting, $w_n$, at each element in the array, to vary the scan angle, $\theta_s$.

In digital beam steering, one or more transmitting antennas are used in combination with multiple receiving antennas and, in the absence of such combining circuitry, the signals at each antenna are converted from the analogue domain into digital signals before being input to the digital signal processing elements of the receiver. In this type of system beam forming can be performed at the receiver using digital circuitry to perform further mathematical processing such as summation, subtraction or by the introduction of phase-delays between elements, similar to that previously described for their analogue counterparts. For the case of a Multiple Input Multiple Output (MIMO) radar discussed in more detail below, one of the steps which can be performed is an 'angle FFT' on the complex received signals from each receiver across the array, in order to resolve the target angular position. The angle FFT is a means of computing the Discrete Fourier Transform (DFT), with which the Array Factor equation is analogous. The angle FFT is performed over the MIMO radar's field of regard, and outputs a peak at the angle(s) where a target is present. The angle FFT peak takes the shape of a beam, or main lobe. By using more receive elements, the width of the beam can be made narrower, and hence the ability to resolve between closely spaced objects is enhanced.

Conventional digital beamforming architectures incorporate a dedicated receiver for each physical antenna (i.e. M receivers for M×RX antennas). When a low angular accuracy is required, a wide beam is sufficient and is obtained using a small number of antenna elements. This means a minimal number of receivers can be employed. However, when high angular accuracy is required, a narrower beam is needed. Additional antennas are therefore required, as illustrated in the difference between the antenna beam patterns 215 and 225 shown in FIG. 2. This results in an increase to the overall radar cost and size. As a result, applications that require high angular accuracy such as automotive radar have to date proved expensive. Where low cost is required, radar using conventional digital beamforming MIMO has been limited to applications restricted to using a minimal number of elements and hence to wide beam applications.

For systems where digital beamforming is not used, the same general relationship applies, i.e. higher angular accuracy requires more antenna elements. However, analogue beamforming networks often use beam switching so that fewer receivers are needed to process the signals received from the RX antenna array. Analogue beamforming networks are therefore comparatively very large when compared to their digital alternatives and have an associated proportional cost increase. A common compromise between purely analogue and purely digital beamforming networks is to use digitally controlled switch networks along analogue beamformer(s), where the connections to different antenna elements are connected or switched to a single receiver in turn. Such systems, while saving on receiver cost, still must ensure phase balance between antenna elements and therefore the beamforming network and resulting radar cost can still be quite large.

Beam forming and beam steering typically both use scaling (scaling is also referred to as tapering or weighting in the art) to form a beam pattern where the signal strength to or from different antenna elements ($w_n$) is amplified or attenuated to manipulate the overall shape of the combined beam. When beam steering is applied on the transmitter side, the beam pattern is generally manipulated so that only one radiation pattern can exist physically at one time. On the receiver side however, digital beam forming could use different element scaling algorithms to form multiple beam patterns at the same time in parallel to get multiple outputs.

In one known embodiment of a digital radar, multiple transmitters and receivers work together to form a 'digital' type MIMO radar. There are predominately two different types of MIMO radars. The first type is called statistical MIMO, in which the antennas (comprising of both the TX and the RX antennas) are placed far apart from each other to provide different views of the object or 'scene'. The second type of MIMO is called a beam forming (or co-located) MIMO, whereby the antennas are placed close to each other and act together to form a 'virtual' beam forming array. The present disclosure is directed towards improvements in this second type of MIMO radar.

For E-band automotive radar systems, the frequency of operation preferably lies within a frequency band of a first bandwidth of 76-81 GHz. (However, for certain applications depending on the specific nature of the radar (e.g. long range, medium range, short range, etc.) the full width of the frequency band need not be used). This breadth of the first bandwidth presents significant challenges as those familiar with the technology will appreciate. For example, there is a difficulty in ensuring that frequency invariant beam forming does not degrade as a result of performance variations of individual components at different frequencies within the first bandwidth.

Many conventional systems achieve wideband beam forming by using filter banks which work either in the time domain with two-dimensional filter banks, or in the frequency domain (after FFT), filtering each band separately. In essence, the wideband signal is split into many predefined sub-bands which are individually narrowband filtered.

The system of the present disclosure overcomes this challenge by using a Rotman lens to replace the aforementioned digital angle FFT calculation within the MIMO system, and simultaneously operates with minimal degradation over all usable frequencies. In this respect a compromise is found between a purely 'digital' and a purely 'analogue' type system.

In a conventional MIMO system, the magnitude and phase of the signal received at N antennas (multiple inputs) from each of M transmitters (multiple outputs) in the system can be used to form a 'virtual' receive array that is larger than the physical receive array (i.e. the virtual receive array has more 'virtual' RX antennas than the N antennas in the physical antenna array). This enables improved object angular resolution.

Various multiplexing schemes for MIMO exist which aim to achieve orthogonality between the signals transmitted by each individual TX transmitter, such that they can be separated out on the RX side. These include, but are not limited to, Time Division Multiplex (TDM), Frequency Division Multiplex (FDM) and Binary Phase Multiplex (BPM).

Figure 3:
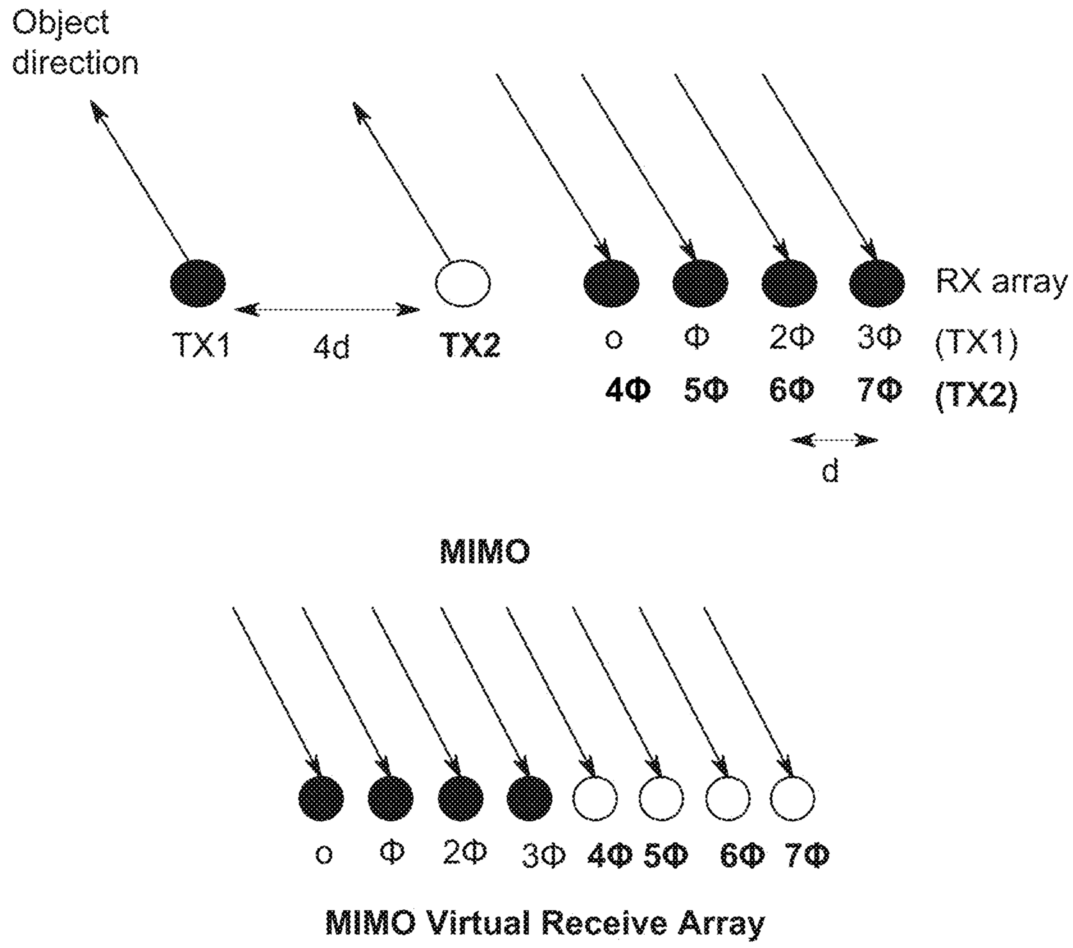
FIG. 3 shows a prior art MIMO configuration, equivalent to the conventional 8 receive element antenna configuration shown in FIG. 1.
Figure 4:
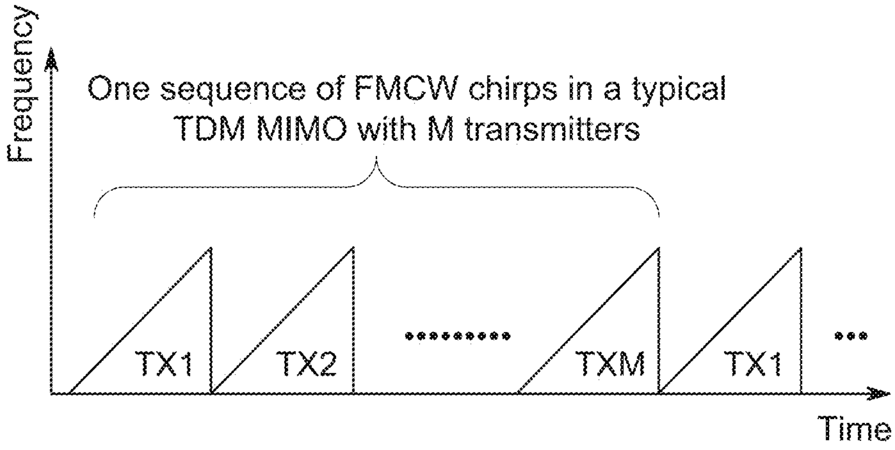
FIG. 4 shows an example of TDM used on the transmit side of a FMCW MIMO system using a number of transmitters M>2.

With reference to FIG. 3 for TDM MIMO, the transmitters sequentially transmit a signal one at a time (e.g. TX1 transmits a signal and after a predefined delay TX2 then transmits the signal). As a result, the receive elements then receive signals originating from each of the transmitters sequentially in time. This is shown in FIG. 4 for a Frequency-Modulated Continuous-Wave (FMCW) radar with a total number of M transmitters, where M>2. Thus, the signal originating from each transmitter can be separated according to which transmitter the signal originated (e.g. the signal received from TX1 can be separated from TX2).

Other methods can be used to separate out the signals received by the MIMO according to which transmitter they originated from. For example, in BPM MIMO, the phases of the transmitted signals are given unique, orthogonal codes consisting of a sequence of +1 (i.e. 0° phase shift) and −1 (i.e. 180° phase shift) weightings, and applying these codes to demultiplex the signals at each receiver resolves the signal into separate signals according to which transmitter each code corresponds to. In FDM MIMO, the transmitters operate over different frequency slots, instead of time slots, and separated on the receive side using a frequency shift and filter operation.

Due to being able to separate the signals from the TX antennas at the receiver and by suitably configuring the distances between the TX antennas and the RX antennas, the signals received at each RX antenna can be rearranged corresponding to the transmitter from which they originated. As a result, the phase differences on each received radiated wave is such that an equivalent larger number of receive elements appear than are actually present, and thus 'virtual' antennas are created. For example, as shown in FIG. 3, by separating each of the four RX antennas by a distance of d and separating the TX antennas by a distance of 4d, a virtual array is formed which consists of 2×4 RX antennas. More generally, in a MIMO system of M×TX antennas and N×RX antennas it is possible to obtain a virtual array of M×N RX antennas using only M+N physical antennas. Thus, the angular resolution of the virtual array is much finer than that of the physical array when not used in a MIMO implementation. The MIMO technique is therefore effective for improving the angular resolution of the radar for a given number of transmitters and receivers, or to decrease the number of transmitters and receivers required for a given angular resolution.

With further reference to FIG. 3 and FIG. 4, it is noted that when a MIMO system is used in TDM mode, each virtual element in the MIMO system cannot be measured at the same time because of the time delay between transmissions required to obtain TDM. In the example shown in FIG. 3, measurement of the RX antennas has to be repeated twice (i.e. once for each TX antenna) on each 'real' RX antenna to acquire a signal for a virtual array of eight antennas. In contrast, the system of FIG. 1 (having eight physical antennas), can obtain a measurement from each RX antenna concurrently. While both systems will yield the same results in terms of direction and range accuracy, this calculation will be quicker in the system of FIG. 1.

FIG. 3 shows a MIMO configuration for a system where the radar will only have good angular resolution determination in one axis (using a linear array of many elements), but none in the other axis (single element).

Figure 5:
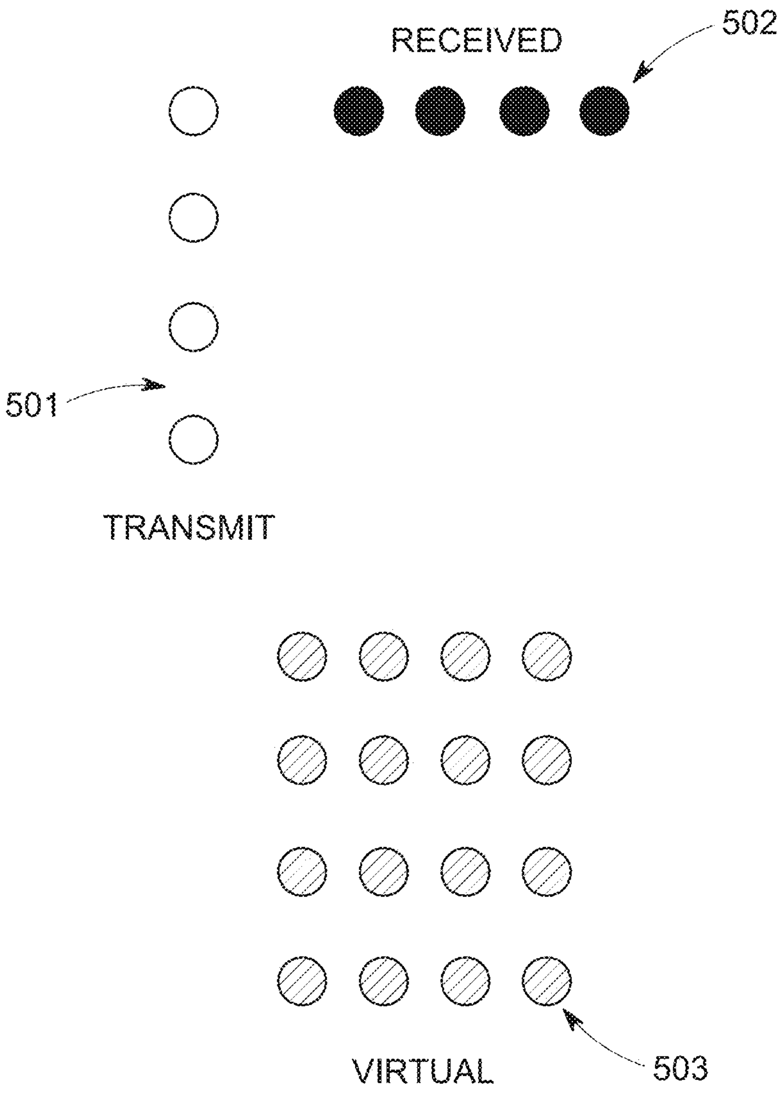
FIG. 5 shows prior art of a MIMO array for a radar system with 3D mapping.

By comparison, FIG. 5 shows an alternative arrangement for 2D angular coverage. Here, the transmit elements are arranged in a first linear array 501 in one orientation, while the receive elements are arranged in a second linear array 502 in a second orientation, wherein the second orientation is at an angle to the first linear array. The resultant virtual array 503 is able to locate the angular position of an object with respect to both the first and second orientation, and as a result, the absolute position of an object can be calculated. Preferably, the first and second linear arrays are at an orthogonal orientation to each other.

EP3497473A1 discloses that, by using a 3D printed Luneburg lens, the angle resolution can further be improved. The advantage of using lenses is that by varying the shape of a lens or their geometry relative to the antenna elements, it is possible to design multibeam radars with various FOVs or various gain properties. Luneburg lenses however are three dimensional structures which are generally difficult to design and manufacture due to the varying refractive index materials required. They are difficult to integrate with planar printed circuit boards due to their spherical focal surfaces, and therefore require complex designs to connect to the radar motherboard.

For a MIMO radar, the radar enclosure size is less of a limiting factor, as MIMO radar can synthesize virtual arrays with a large aperture using only a small number of transmit and receive antennas.

Figure 6:
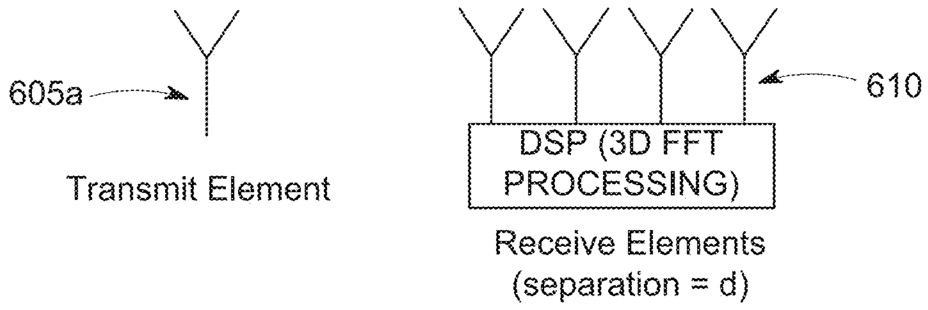
FIG. 6 shows the normalised receive array radiation pattern scanned to 0 degrees for a radar with a single transmit element and 4 receive elements.
Figure 6:
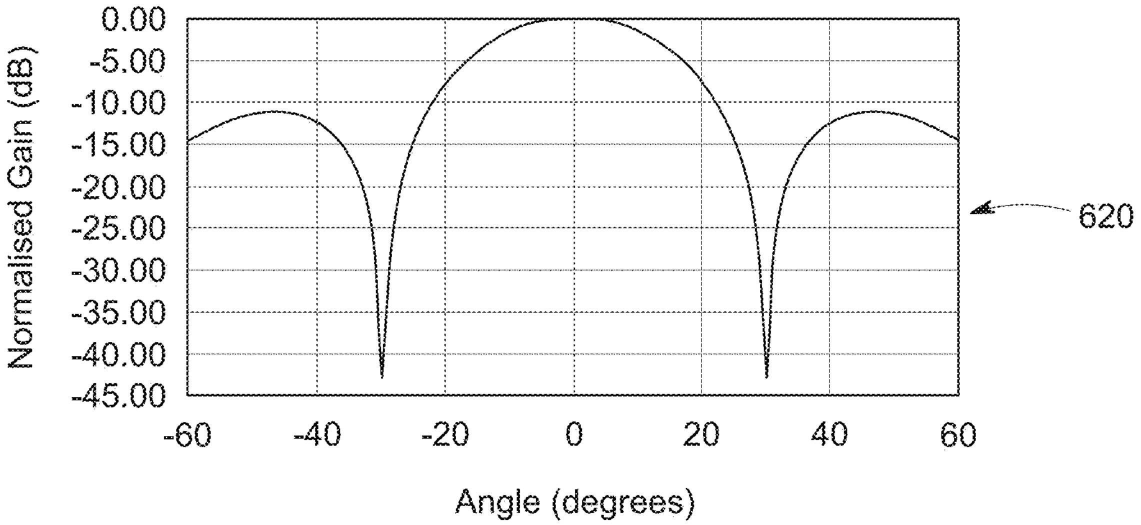

FIG. 6 shows a normalized radiation pattern 620 obtained using one TX antenna 605*a* and four RX antennas 610, measured across its FOV and centred at 0°. The resulting antenna beam pattern is identical to the 4-element array shown in FIG. 2.

Figure 7:
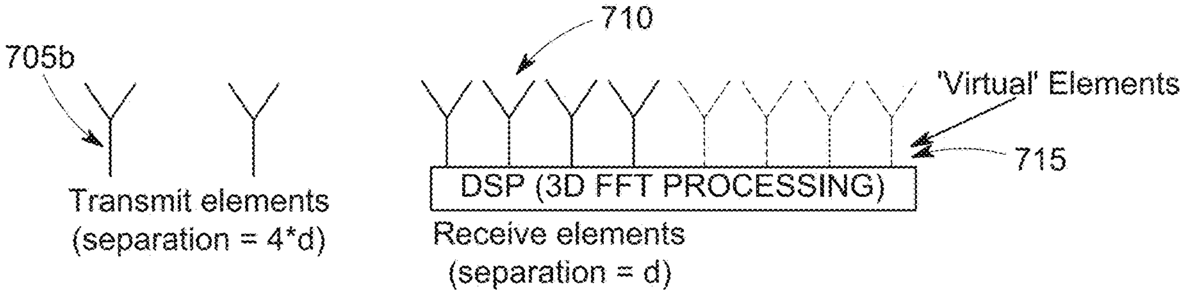
FIG. 7 shows the normalised virtual receive array radiation pattern scanned to 0 degrees for a MIMO radar with a 2 transmit elements and 4 receive elements.
Figure 7:
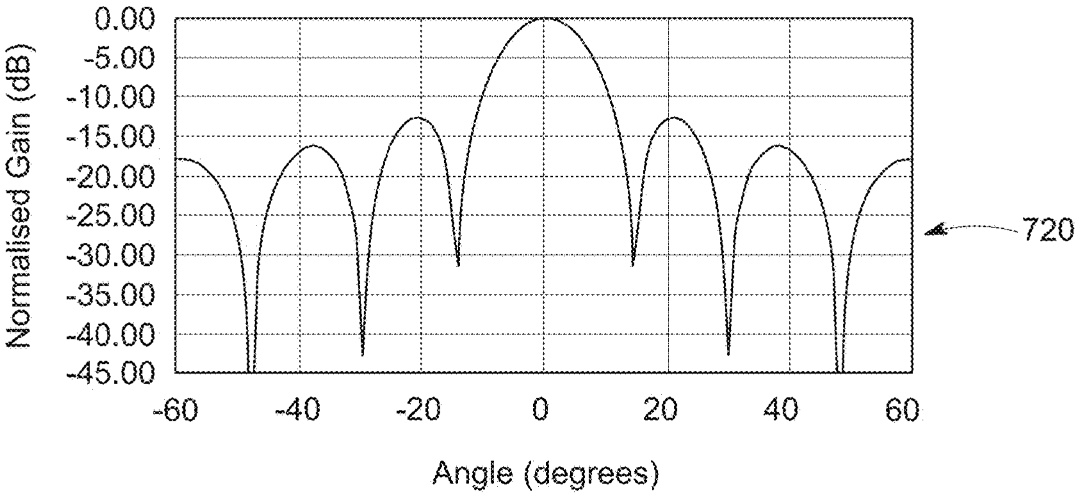

However, as shown in FIG. 7, by the introduction of a second TX antenna 705*b* and the same four RX antennas 710, an array of four virtual RX antennas 715 is added to the existing physical RX antennas 710. This results in a virtual array of eight RX antennas, resulting in the 8-element beam pattern 720 shown in FIG. 2. Thus, the angular resolution of the antenna array is doubled through the addition of 4 virtual antennas 715 but at the cost of only one single additional TX antenna 705*b*. When the antenna beam patterns in FIG. 2 are further examined, the effect on the angular resolution becomes apparent as the beamwidth is reduced by half, thus doubling the angular accuracy.

Figure 8:
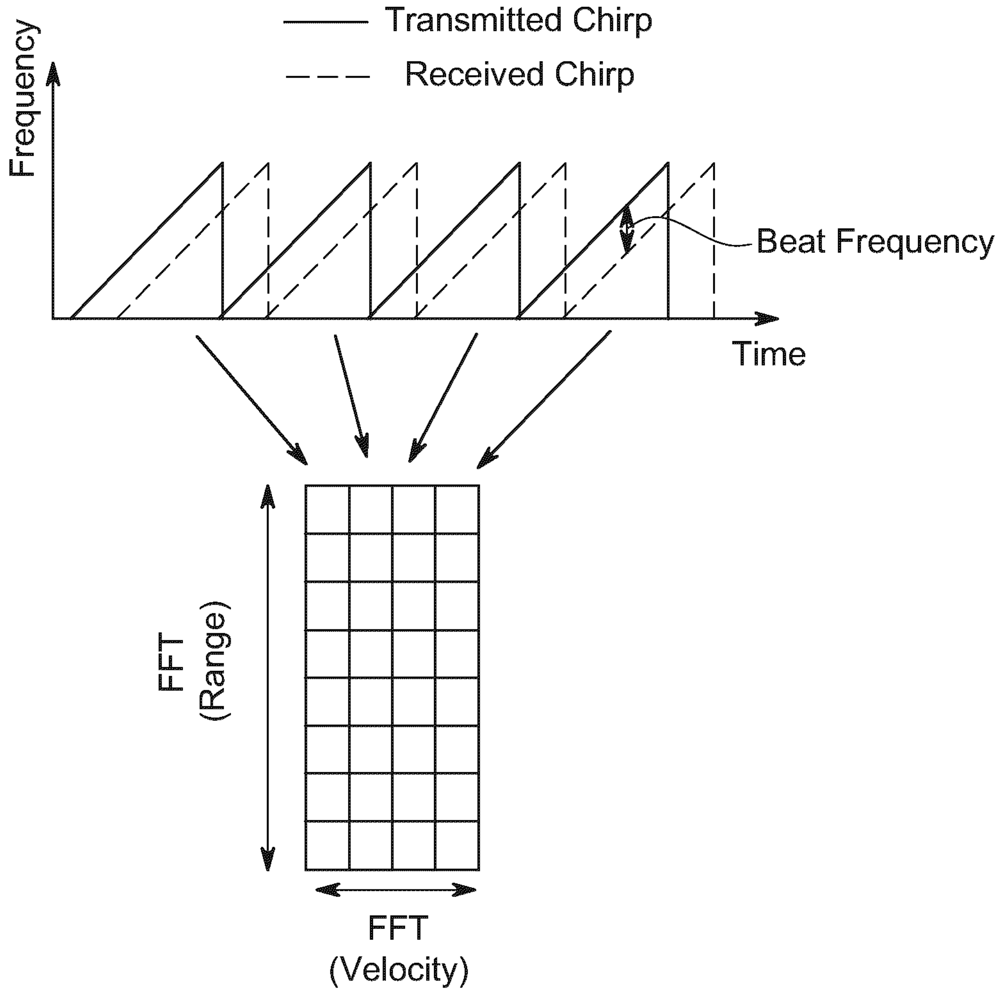
FIG. 8 shows the FMCW radar chirps and the resulting range and velocity estimations performed using a 2D FFT.

FIG. 8 shows a system in accordance with the present disclosure. Preferably, the system is configured to use FMCW (Frequency Modulated Continuous Wave) modulation. A FMCW waveform, also referred to as a chirp, is a complex sinusoidal waveform whose frequency increases linearly with time. FMCW radars transmit chirps in a periodic fashion, at a period referred to as the pulse repetition interval (PRI), and most commonly the frequency is swept in a sawtooth configuration, although other chirp types are available. The resulting target echo from the scene will contain a delayed and attenuated copy of the transmitted chirp. The transmitted and received signals for automotive radars are typically mm-wave signals, preferably in the range of 76-81 GHz. Mixing the received signal with the transmitted chirp results in a beat signal. The beat signal is a complex sinusoidal waveform having a much lower frequency than the transmitted and received frequencies. Typically, the beat signal is in the MHz frequency range for automotive radars. The frequency of the beat signal is proportional to the distance to a detected object. Multiple chirps are collected within a single 'frame', which thereby allows determination of doppler frequency changes in the 'slow time' dimension.

Estimation of the beat frequency is usually implemented in the digital domain, after the beat signal has been digitally sampled. Since the beat frequency is much lower than the radar bandwidth, a low-speed analogue-to-digital converter (ADC) can be used. In particular, the beat signal is sampled. The samples for each chirp are then preferably placed into separate columns of a matrix. The row indices of the matrix will then correspond to the 'fast' time taken across a single chirp and the column indices will correspond to the 'slow' time taken across multiple chirps.

By employing a Fast Fourier Transform (FFT) in each column of the matrix shown in FIG. 8, the range of the object can be determined through detection of the beat frequency. By subsequently applying a further FFT along the rows of this matrix, the velocity of the object can be determined through detection of the doppler frequency. The use of these two FFTs is commonly named a 2D FFT and allows objects to be tracked in terms of both range and velocity. A concomitant benefit of performing the 2D FFT is that it lowers the noise floor through matched filtering of the object's beat and doppler frequencies. The number of objects that fall into the same range-velocity bin will typically be small, depending on the range and velocity resolution of the radar.

While the range-velocity plot gives a lot of useful information it lacks detail on an object's angular position. The angular position of an object is the angle between i) a line connecting the object to the centre of the physical RX antennas and ii) a line at right angles to the line of physical RX antennas, running from the centre of the physical RX antennas. If this angle is zero, the object is straight ahead of the receiver. However, the object's angular position can be obtained by taking instantaneous range-velocity plots at each of the RX antennas (including both real and virtual RX antennas) and performing a 3rd 'angle' FFT or 3D FFT, as shown in FIG. 9.

For angle accuracies <1°—which is the current requirement in automotive safety radars—uniform arrays of over one hundred antennas (virtual and real) are required. The cost of processing receive signals from such a large array is very high, requiring CPUs that have high floating-point-operations-per-second (FLOPS) capabilities. The alternative is to use cheaper and slower CPUs, but this results in a longer and therefore less safe detection time.

Incidentally, the above signal processing steps typically occurs after a Constant False Alarm Rate (CFAR) thresholding step. The CFAR step filters out received signals below a predetermined threshold (wherein the threshold is selected to be a magnitude above ambient noise) such that only bins with a signal-to-noise ratio that exceeds this threshold are retained.

Figure 9:
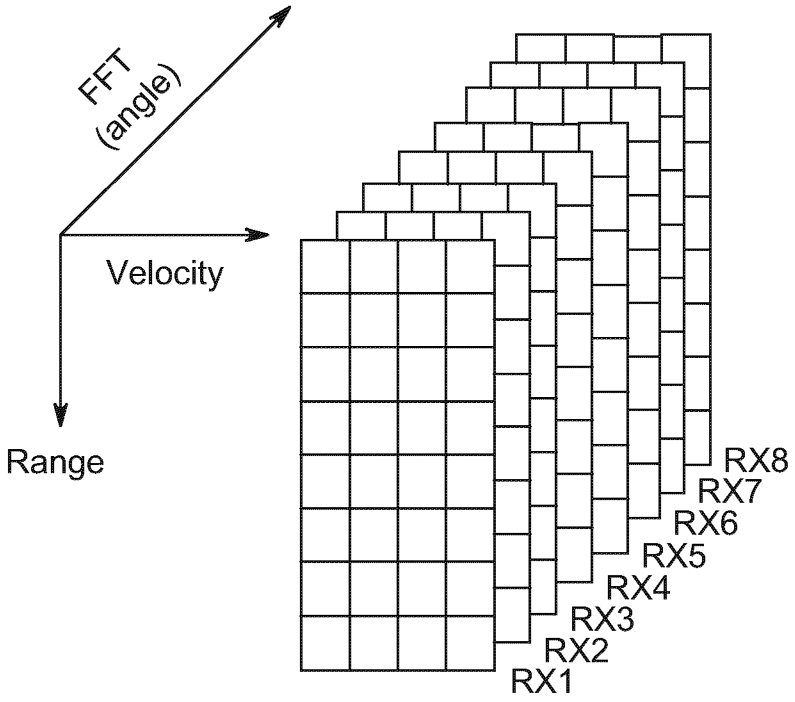
FIG. 9 shows a further FFT on the range and velocity domain over all receivers to calculate angle in a conventional MIMO radar.
Figure 10:
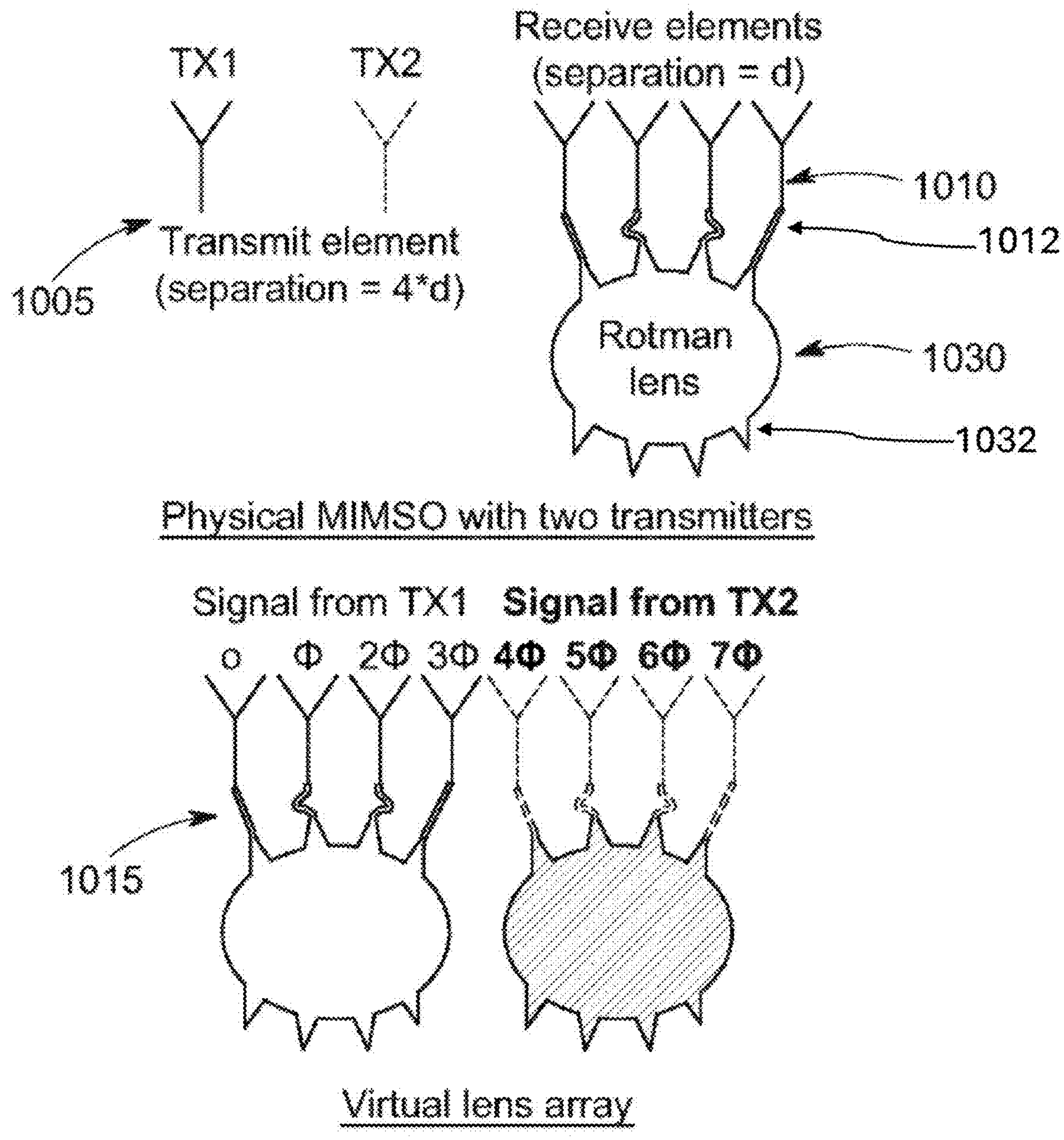
FIG. 10 shows a MIMSO configuration in accordance with the present disclosure.

The present disclosure removes the need for the use of the 3rd angle FFT, shown in FIG. 9. Instead, a beamforming network is added between the physical RX antennas and their respective receivers, as shown in FIG. 10. Preferably, the beamforming network includes a lens and more preferably a Rotman lens. The beamforming network 1030 is added between the physical RX antennas 1010 and their respective receivers (not shown). FIG. 10 shows four RX antennas 1010, input ports 1012 and beam forming ports 1032, those skilled in the art will recognize that a larger or smaller number of antennas could be used. As previously discussed with reference to FIG. 7, the addition of an additional TX antenna 1005 results in a receiver array comprising virtual elements 1015.

Figure 11:
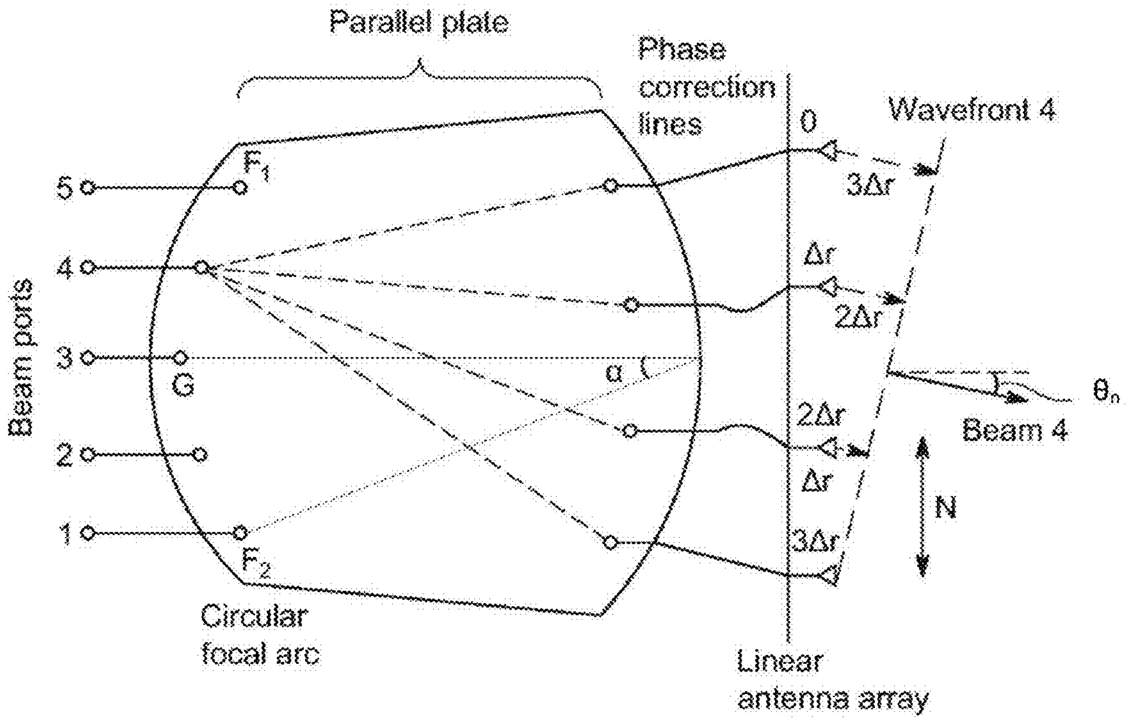
PRIOR ART FIG. 11
FIG. 11 shows prior art of a typical Rotman lens configuration.

Preferably the beamforming network comprises a Rotman lens. FIG. 11 shows the prior art geometry of a conventional Rotman lens. It comprises a plurality of input or beam ports, a lens cavity region, and a plurality of output or array ports. For illustrative purposes, the lens shown in FIG. 11 has five beam ports and four array ports, but it should be appreciated that any number of ports can be used. The beam ports are situated along a focal arc at one edge of a parallel plate region of the lens, while the array ports are located on the opposite edge. The array ports are connected to an array of antenna elements through phase correction lines. When each receive array element is excited by a wavefront, a signal propagates through the phase correction lines to the parallel plate region, before being sampled at the beam ports. The design of the path lengths within the Rotman lens is such that the signals combine coherently at one or two beam ports corresponding to the relative angle the signal arrives at from the object. For a conventional Rotman lens design, having $N_b$ number of beam ports, and designed to have max focal angles, F1 and F2 at ±α°, $N_B$ number of beams are formed at fixed angles of $\theta_n$ for the $n_b^{th}$ beam port;

$$\theta_n = \alpha\left(\frac{N_B - 2n_b + 1}{N_B - 1}\right)$$

As such, the Rotman lens operates as a circuit element that can be used to replace a digital FFT with an analogue DFT, for a finite number of fixed beam angles.

To apply the MIMO technique to the Rotman lens, the signals from each separate transmitter are combined coherently. Preferably, this is performed following the 2D FFT and CFAR steps and may also require additional phase compensation to correct for phase errors due to target motion between the times at which chirps are received at a given lens beam port from separate transmitters. However, neglecting these steps for ease of illustration, the signals received at the $n_b^{th}$ beam port, from one sequence of chirps from the M transmitters, are mathematically combined, with an additional phase term applied to each to form a beam at the correct angle $$S_{MIMSO}(n_b) = \sum_{m=1}^{M} S(n_b, m)e^{j(m-1)\varphi_m}$$

The phase term, $\varphi_m$, is given by:

$$\varphi_m = \frac{2N_A\pi}{\lambda} d\sin(\theta_n)$$

Where $N_A$ is the total number of elements in the receive array, and $\theta_n$ is the scan angle of the $n_b^{th}$ beam port.

Figure 12:
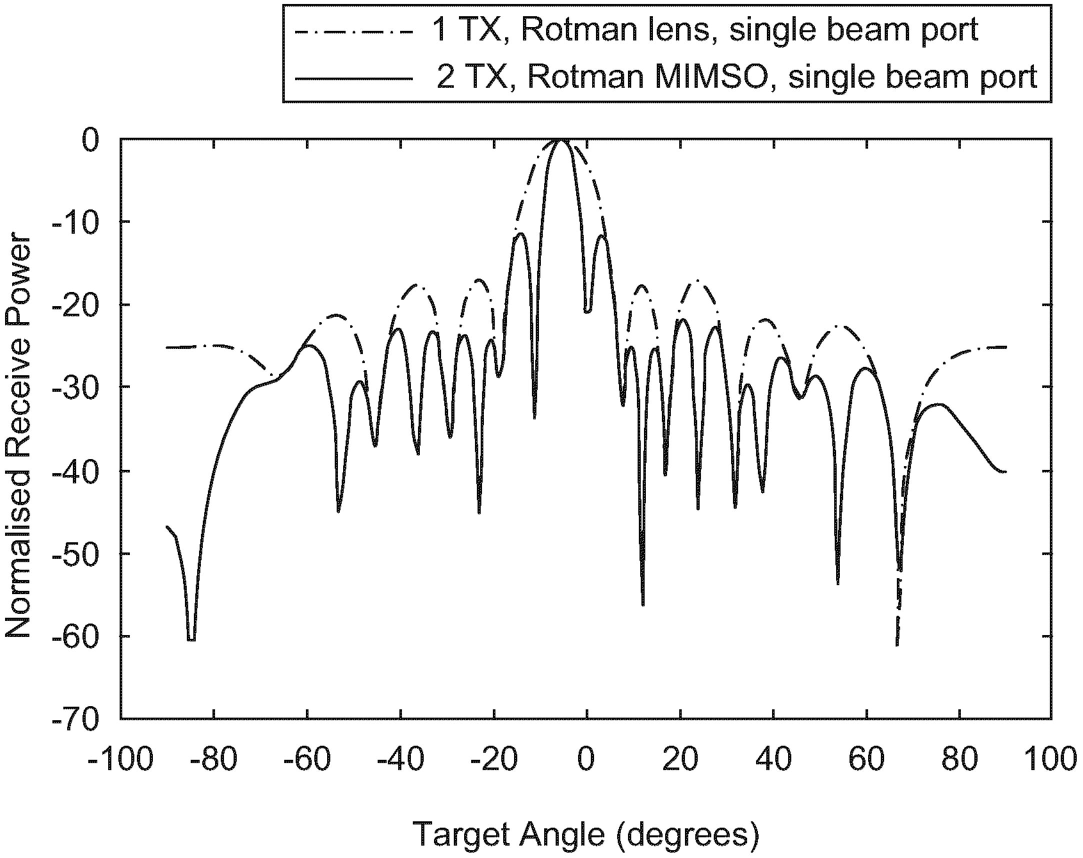
FIG. 12 shows a comparison between target detection power level vs. angular position of a car for a single output port of a Rotman lens design with 10 receive antenna elements, using a single transmit antenna configured as a MIMSO radar system using two transmit antennas.

By applying this technique, the radar return, plotted as normalised receive power, from e.g. a car at an angular position of −6 degrees is shown in FIG. 12. Here a beam is formed at this angle from a single output of a Rotman lens design with 10 receive antenna elements. As can be clearly seen from FIG. 12, a peak in receive power is present at −6 degrees.

The system therefore uses MIMO detection, but with a steered output and can now be classified as a Multiple Input Multiple Steered Output (MIMSO) system. Furthermore, as Rotman lenses are designed based on time delays rather than phase delays, such a configuration allows a simple method of ensuring broadband operation.

With reference to FIG. 10, an explanation is now given for operation of the MIMSO system. As described previously for MIMO systems, a virtual array is implemented in a MIMSO system, by using multiple transmitters and multiple receivers, with each physical receiver located at one of the Rotman lens output (beam) ports, with the result that a virtual Rotman lens is also connected to the virtual array.

Preferably, a modified Rotman lens design is used instead of the design used in normal beam steering applications. In a conventional Rotman lens with a uniform linear array, the Rotman lens beam ports are typically designed to detect angles according to the half power beam width (HPBW), in other words the beams are designed to overlap at their −3 dB points (relative to the beam peak). However, for a Rotman lens in accordance with the present disclosure, the HPBW of the lens's beams is designed such that it is increased by a factor of approximately M relative to the desired HPBW of the MIMSO system, where M is the number of transmitters in the MIMSO system. As a result, the HPBW of the beams is advantageously narrowed by a factor of approximately 1/M. Those skilled in the art will recognise that the example of two TX antennas is not limiting and the Rotman lens beam ports can be designed to suitably detect angles from M×TX antennas.

As noted above, certain types of electrical circuits can behave as if performing a mathematical function on a received signal. The simplest example of this is a low pass filter, which allows DC and low frequency signals to pass while removing higher frequency ones and can therefore be interpreted as a mathematical integrator. In a MIMSO system, the Rotman lens acts in a similar manner, performing the function of an angle FFT in this case.

Figure 13:
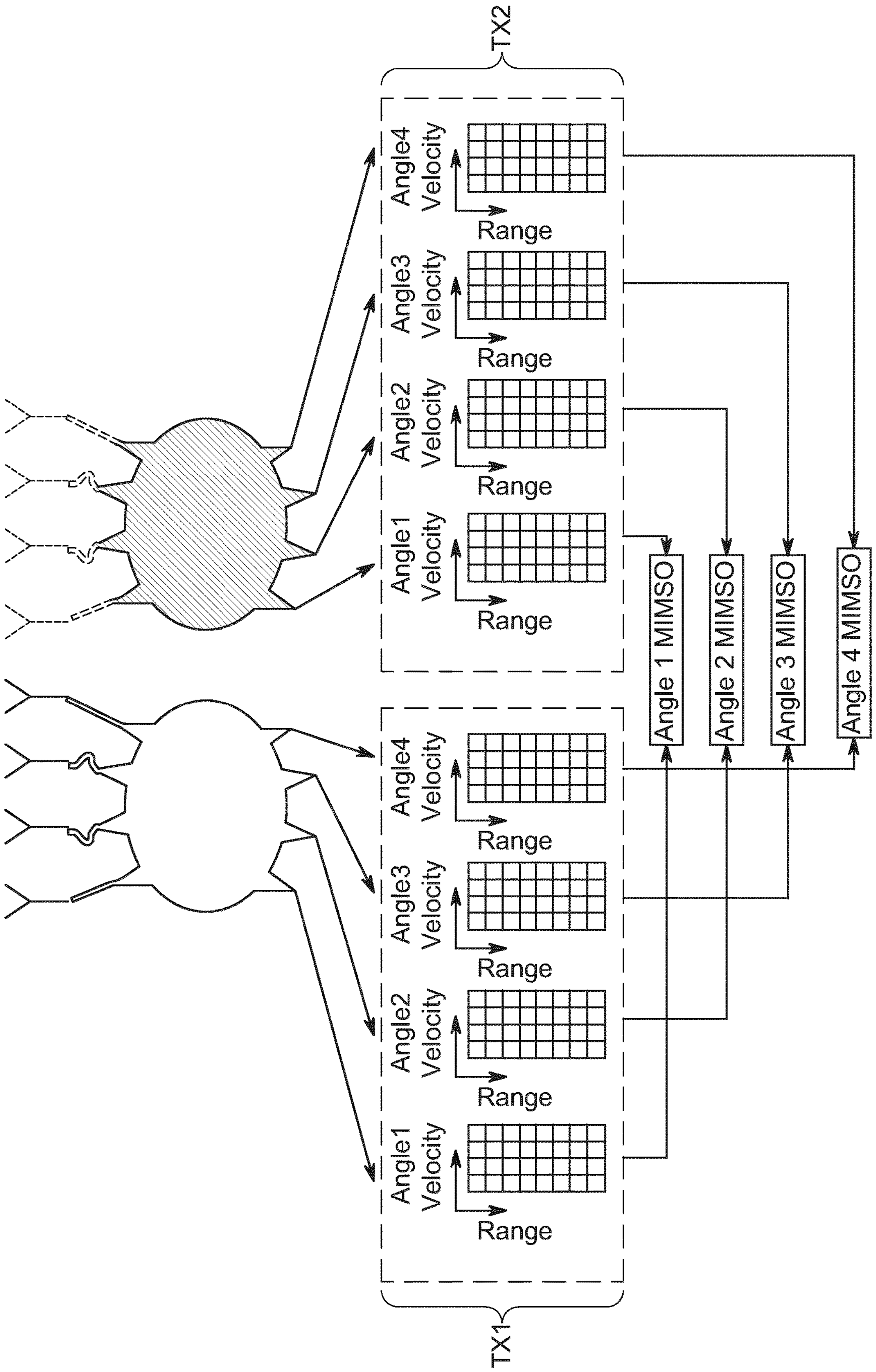
FIG. 13 shows the MIMSO angle processing configuration in accordance with the present disclosure and FIG. 14 shows an example of a Rotman lens with reconfigurable beams and high angular accuracy towards the centre of the radar with less accuracy towards the edge of the field of view.

FIG. 13 shows how MIMSO processing is completed for a system using two transmitters. Similar to the MIMO system shown in FIG. 8, the range and velocity are similarly calculated using a 2D FFT. However, in a MIMSO system in accordance with the present disclosure, the angular position of an object is determined by using the beam ports of a beamforming network such as a Rotman lens. As detected signals received at each beam port corresponds to a different detection angle, the further 3D FFT is not required to determine the detection angle. As noted above, the Rotman lens optionally is modified by narrowing the HPBW of the beams by a factor of approximately 1/M, where M is the number of transmit elements.

Figure 14:
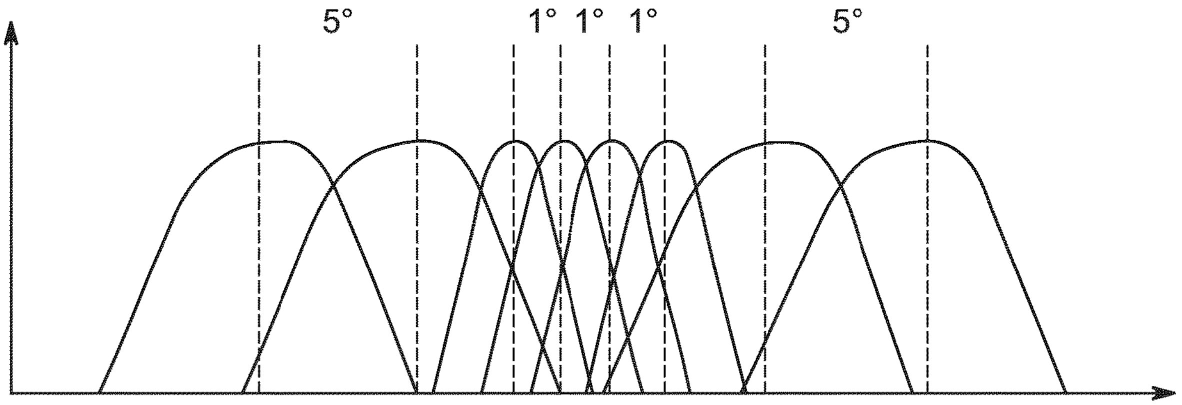

Furthermore, the Rotman lens can also be optionally modified to produce beams at non-uniform angle s. FIG. 14 shows one embodiment where the density of the beams pointed towards the centre of the radar FOV (where angular accuracy is most critical), is greater than the density of the beams pointed towards the edges of the radar FOV (where angular accuracy is not as important).

The size of the virtual array is the number of transmit elements multiplied by the number of receive elements. By concentrating the beams towards the centre of the radar FOV, it is also possible to use the signals from all the transmitters for the narrow inner beams and discard the signals from one or more of the transmitters for the outer beams, resulting in a smaller virtual array, and hence a wider beam pattern.

Although a beamforming network such as a Rotman lens adds a small increase in size when compared to a MIMO radar system, it removes the need for the third FFT calculation. Instead the third FFT is performed instantaneously at the beam ports of the beamforming network. As the processing requirements and the time taken to determine an object's angular position is removed, the MIMSO system disclosed herein offers a considerable improvement over existing radars, such as those for automotive applications. As a result of the faster detection time provided by MIMSO systems, a faster reaction time is provided. This in turn leads to safer outcomes to road hazards.

A Rotman lens is particularly suitable for use as a beamforming network. As the Rotman lenses are planar, they can be implemented on a single PCB with other components of the radar. Thus, it offers a further cost-effective benefit over the integration of larger lens-based radars, and in particular Luneburg lenses.

It is also possible to apply a phase comparison monopulse technique in a MIMSO system in accordance with the present disclosure. The phase comparison monopulse outputs are calculated based on the results from the real RX antenna and their equivalent virtual RX beam ports. The main direction of the object is given by the beam port at which the detected object is found and corresponds to the angle of the Rotman lens beam port, with the enhanced direction given by the summation of the beam port direction and resulting phase comparison monopulse calculation. This combined MIMSO-monopulse processing may enable improved angular position determination.

Phase comparison monopulse outputs can also be calculated based on the results between each pair of consecutive beam ports of the Rotman lens (i.e. one and the next sequential beam port as illustrated in FIG. 11). The main direction of the object is given by the midpoint between the beam ports at which the detected object is found with the enhanced direction given by the summation of this mid-beam port direction and the resulting phase comparison monopulse calculation. It is also noted that these two methods could also be used in combination.

Conventionally, the beam angles of a Rotman lens are fixed during the design, and cannot be scanned continuously over the field of view as in a conventional phased array or MIMO system. However, in a MIMSO system in accordance with the present disclosure using a Rotman lens, the beam angles of the combined MIMSO beams can be varied by small amounts by adjusting, $\varphi_m$ (the additional phase term), which is applied when the received signals from the separate transmitters are combined. Furthermore, by combining the beams formed by adjacently located ports (with the proper phasing), similar to the sum beam of a monopulse system, the resultant signal corresponds to a beam located at the average angle of those two individual ports. Through the combination of these two techniques, along with the design of the lens, it may be possible to digitally scan the lens continuously over its FOV.

Furthermore, by using three or more transmitters in the MIMSO system, an amplitude taper may be applied to the combined MIMSO signal. This advantageously allows the digital reduction in the sidelobe levels of the beam pattern, thereby reducing clutter and the likelihood of false target detections. Alternatively, sidelobe levels from a beam can also be reduced by the subtraction of the signals received on one or more other beams, with scaling factors applied. As a further alternative, these two sidelobe reduction techniques can be also be used together.

The MIMSO system disclosed herein can be constructed from discrete elements, however it is preferably fabricated on a printed circuit board. More preferably, the system is configured for use with electromagnetic radiation having millimetre wavelengths in the E-band frequencies designated for automotive radars (i.e. electromagnetic radiation having a frequency in the range of 76 to 81 GHz) to determine object locations and trajectories with increased accuracy and speed.

The MIMSO system described above can also be used in conjunction with one or more of lidar and stereo camera. Furthermore, machine learning can be used to enhance the performance of the system.

The above examples are provided for the purposes of illustration and are not intended to limit the scope of the present disclosure. Instead, the scope of the present disclosure is set out in the appended claims.

The invention claimed is:

1. A radar for a road vehicle comprising:

a beam-forming network comprising a Rotman lens having a first number of input ports and a second number of beam-forming ports, wherein the first and second numbers are greater than 1;

a first number of antennas, wherein the first number of antennas is for receiving signals and each antenna in the first number of antennas is connected to a respective input port of the beam-forming network;

a second number of receivers, wherein at least two receivers can operate simultaneously and each receiver of the second number of receivers is connected to a respective beam-forming port of the second number of beam-forming ports;

a third number of antennas, wherein the third number of antennas is for transmitting a signal, wherein the third number is greater than 1; and a processing means configured to determine the position of an object relative to the radar based on the magnitudes and phases of signals received by the receivers, wherein:

the beam-forming network is configured to combine coherent signals received by at least two of the first number of antennas from at least two of the third number of antennas, the processing means is further configured to mathematically apply an additional phase term to each signal being combined so as to form a beam at a desired angle, and the Rotman lens forms a virtual array of Rotman lenses through use of the third number of antennas and wherein the half power beam width (HPBW) of individual beams formed by the virtual array of Rotman lenses is decreased by a factor of 1/M relative to beams corresponding to the respective beam-forming ports of the Rotman lens, where M is a number of transmitters in the system.

2. The radar of claim 1, wherein:

the first number of antennas is arranged in a first line, and the third number of antennas is arranged in a second line, wherein the first line is parallel to the second line.

3. The radar of claim 1, wherein:

the first number of antennas is arranged in a line, with a predefined distance d between each antenna, and the third number of antennas is arranged in a line, with a distance of N×d between each antenna, where N is the first number of antennas.

4. The radar of claim 1, wherein the individual beams formed by the virtual array of Rotman lenses overlap at angles where the gain is at half the value of the peak value of each beam.

5. The radar of claim 1, wherein the Rotman lens is configured such that beam ports are concentrated around the broadside of the radar.

6. The radar of claim 1, wherein the antennas are configured to operate with millimetre wave radar signals.

7. A method of determining the position of an object relative to a radar for a road vehicle, comprising:

transmitting signals from a plurality of transmit antennas;

receiving the transmitted signals at a plurality of receive antennas;

providing the received signals from at least two receive antennas to the input ports of a beam-forming network comprising a Rotman lens, wherein the beam-forming network has a plurality of beam-forming ports and the beam-forming network is configured to coherently combine signals received at its input ports and provide the combined signals to its beam-forming ports, and to mathematically apply an additional phase term to each signal being combined so as to form a beam at a desired angle;

obtaining the outputs from the beam-forming network at a plurality of receivers, wherein each receiver is connected to a respective beam-forming port of the beam-forming network; and processing the obtained outputs to determine the position of the object at each receiver based on the magnitudes and relative phases of the combined signals provided to the receivers from the beam-forming ports of the beam-forming network, wherein the Rotman lens forms a virtual array of Rotman lenses through use of a third number of antennas, and wherein the half power beam width (HPBW) of individual beams formed by the virtual array of Rotman lenses is decreased by a factor of 1/M relative to beams corresponding to the respective beam-forming ports of the Rotman lens, where M is a number of transmitters in the system.

8. The method of claim 7, comprising:

configuring the receive antennas so that they are arranged in a first line, with a predefined distance d between each receive antenna, and configuring the transmit antennas so that they are arranged in a second line, with a distance of N×d between each transmit antenna, where N is the number of receive antennas.

9. The method of claim 7, comprising:

configuring the receive antennas in a first line and the transmit antennas in a second line so that the first line is not parallel to the second line.

10. The method of claim 7, wherein the Rotman lens forms a virtual array of Rotman lenses through use of the plurality of transmit antennas and the Rotman lens is configured such that individual beams formed by the virtual array of Rotman lenses overlap.

11. The method of claim 7, wherein the Rotman lens is configured such that the beam ports are concentrated around the broadside of the radar.

12. The method of claim 7, wherein each of the transmitted signals is a millimetre wave radar signal.

* * * * *